United States Patent [19]

Varela et al.

[11] Patent Number: 5,435,793
[45] Date of Patent: Jul. 25, 1995

[54] PLANETARY REDUCTION FOR DRIVE AXLES

[75] Inventors: Tomaz D. Varela, Jaguare; Chung I. Chao, Ipiranga, both of Brazil

[73] Assignee: Rockwell Braseixos, S. A., Brazil

[21] Appl. No.: 88,271

[22] Filed: Jul. 2, 1993

[30] Foreign Application Priority Data

Jul. 31, 1992 [BR] Brazil .................................. 9202976

[51] Int. Cl.⁶ ............................................. F16H 3/44
[52] U.S. Cl. .................................. 475/311; 475/331; 180/244
[58] Field of Search .............. 475/331, 311; 192/4 B; 180/244

[56] References Cited

U.S. PATENT DOCUMENTS

| | | | |
|---|---|---|---|
| 1,974,230 | 9/1934 | Armington | 475/331 X |
| 2,998,735 | 9/1961 | Elfes | 475/331 X |
| 4,649,772 | 3/1987 | Daniel et al. | 475/331 |

*Primary Examiner*—Charles A. Marmor
*Assistant Examiner*—Mary Ann Battista

[57] ABSTRACT

Planetary reduction for drive axle, of the type comprising: an axle housing (60), which is attached to the chassis of vehicle and lodges an axle shaft (50) that holds an end central sun gear (70), which is meshed with a ring gear (90), which is internally toothed and coupled to the axle housing (60), through planetary pinions (80) mounted on respective shafts (81), which are attached to a planetary spider (100) coupled to a wheel mounting flange (110); and an optional disc brake assembly (130), which has at least one stationary disc (132) and one friction disc (133); an output shaft (101), which is attached to the planetary spider (100) and which supports the wheel mounting flange (110); a wheel bearing cage (120), which is coupled to the axle housing (60) and supports the output shaft (101), through a wheel bearing set (121);

a brake housing (131), which is coupled to the axle housing (60) and which attaches thereto said stationary discs (132);

removable fastening elements (140), which are provided through the axle housing (60), the wheel bearing cage (120), the ring gear (90) and the brake housing (131), in order to keep said ring gear (90) and brake housing (131) attached one to the other and between said axle housing (60) and wheel bearing cage (120).

2 Claims, 5 Drawing Sheets

PLANETARY REDUCTION FOR DRIVE AXLES

FIELD OF THE INVENTION

This invention relates to a planetary reduction, which incorporates wet disc brakes in most cases and will generally be mounted on the drive axle's free ends and, more particularly, on the wheel ends of drive axles used in off-highway vehicles and other equipments.

BACKGROUND OF THE INVENTION

The planetary reductions for drive axle's free ends basically consist of a plurality of planetary pinions (usually three), located in the same plane that is orthogonal to respective axle shaft, said planetary pinions being maintained in constant mesh with a central sun gear, which is coupled to the axle shaft end, and with an internally toothed ring gear, which is attached to the housing spindle of axles, said planetary pinions being further mounted on axial pins attached to a rotating cast spider or flange, which is operatively connected to the wheel hub of vehicle. In this known construction, in which axle shaft free end is floating in relation to housing spindle, the planetary spider-wheel hub assembly is supported through wheel bearings located between said assembly and an external surface portion of housing spindle. One known type of planetary reduction for a drive axle end is illustrated in FIG. 1 of attached drawings.

In this known solution, the structural system which supports the wheel, transmitting efforts coming from ground to the chassis of vehicle, comprises housing 1, which is attached to the chassis of vehicle and supporting housing spindle 2, which supports, through wheel bearings 3, a wheel hub 4 to which the wheel of vehicle is attached.

The transmission system in the solution of FIG. 1 comprises planetary pinions 10, which are meshed internally to central sun gear 11 mounted to the end of axle shaft 12, and externally to ring gear 13 coupled to housing spindle 2 through ring gear hub 14. The planetary pinions 10 are supported by respective planetary pinion shafts 15, which are mounted on planetary spider 16 coupled to wheel hub 4.

The braking system used in this prior art solution is of the type in which the brake assembly has alternately arranged friction discs 21 and stationary discs 22, said friction discs 21 being coupled to the axle shaft 12 through brake hub 23. The stationary discs 22 are coupled to brake housing 24, which is integral with ring gear hub 14 coupled to housing spindle 2. The pressurized fluid, upon reaching cylinder through hydraulic line 25 generates, through piston 26, a compressive axial force between rotating discs 21 and stationary discs 22 causing, by mutual friction, braking of axle shaft 12 with a braking torque that is transmitted to wheel hub 4 by planetary system, in an amplified way.

Such prior art construction presents some inconveniences which limit its design versatility, durability and reliability. The following inconveniences of said solution can be mentioned:

a—Manufacture inadequacy applying group technology, i.e., provision of a family of products obtained from a basic product, maintaining basic dimensions and internal interfaces;

b—Fitting to different vehicle interfaces is limited by wheel pilot diameter;

c—Modifications in subsystems require replacement of many other components, some of high cost, and installation of a forced cooling system is complicated;

d—Planetary system and disc brake with external diameter being limited by wheel hub result in gears having large widths and in a large number of brake discs. As both parameters have practical limitation, the design is inadequate to a family of products with wide range of mechanical capacity and high degree of communization;

e—Complexity of the hydraulic line for brake actuation affects reliability and cost.

A second type of planetary reduction for drive axle ends is illustrated in FIG. 2 of attached drawings. This second constructive solution also presents a structural system comprising housing 1a, which is attached to the chassis of vehicle and supporting housing spindle 2a, which supports, through wheel bearing 3a, a wheel hub 4a to which the wheel of vehicle is attached.

The transmission system in the solution of FIG. 2 also comprises planetary pinions 10a, which are meshed internally to central sun gear 11a mounted on the end of axle shaft 12a, and externally to ring gear 13a coupled to housing spindle 2a through ring gear hub 14a. The planetary pinions 10a are supported on respective planetary pinion shafts 15a, which are mounted on planetary spider 16a coupled to wheel hub 4a.

The braking system of this solution is also of wet disc type 20a, consisting of friction discs 21a and stationary discs 22a which are alternately arranged, said friction discs 21a being coupled to wheel hub 4a, while said stationary discs 22a are coupled to brake housing 24a, which is coupled to housing spindle 2a through flange 28. The pressurized fluid, upon reaching cylinder through hydraulic line 25a generates, by means of piston 26a, an axial compressive force between friction discs 21a and stationary discs 22a, thus causing, by mutual friction, the non-amplified braking of wheel hub 4a. Although simplifying hydraulic line and installation of forced cooling, as well as eliminating the problem of external diameter of disc brake system being limited by wheel pilot diameter, this solution of FIG. 2 presents all inconveniences mentioned in "a" through "d", related to the solution of FIG. 1. Moreover, the following additional inconveniences should be mentioned:

f—Assembly in a vehicle presenting reduced spacing between chassis support and wheel hub flange can be unfeasible; and g—Disc brake will be of high cost and high weight, due to the large amount of discs required by braking torque level.

A third type of planetary reduction for drive axle end is illustrated in FIG. 3 of attached drawings and comprises a structural system, a transmission system and a braking system, the arrangement thereof being basically the same as that used in the solution of FIG. 1, but with similar parts receiving same reference number, added by letter "b". It should be observed that the braking torque in this solution is transmitted to wheel hub in an amplified way.

One particularity of this solution of FIG. 3 refers to the fact that stationary discs 22b are coupled to brake housing 24b, which is directly coupled to axle housing 1b.

Although the solution of FIG. 3 also simplifies hydraulic line and installation of forced cooling, as well as eliminating the problem of external diameter of disc brake being limited by wheel pilot diameter, this solution presents all inconveniences of "a" through "d" of the solution of FIG. 1, and a further inconvenience "h", since it is not compact enough and has a large quantity of components.

A fourth type of planetary reduction is illustrated in FIG. 4 of attached drawings.

The structural system of this fourth solution comprises axle housing 1c, which is attached to the chassis of vehicle and supports, through wheel bearings 3c, an ouput shaft 5.

The transmission system of this fourth-constructive solution comprises planetary pinions 10c, which are meshed internally to central sun gear 11c and externally to ring gear 13c, said sun gear 11c being optionally integral with axle shaft 12c.

The ring gear 13c is directly coupled to axle housing 1c and the planetary pinions 10c are mounted on planetary spider 16c coupled to output shaft 5.

The braking system of this solution is also of wet disc type 20c, comprising friction discs 21c and stationary discs 22c, which are alternately arranged, said friction discs 21c being directly and optionally coupled to axle shaft 12c, while the stationary discs 22c are coupled to brake housing 24c that is directly coupled to axle housing 1c. This solution presents the same braking operation as that described in the solution of FIG. 3, wherein the braking torque is transmitted to output shaft 5 in an amplified way. Although simplifying hydraulic line and installation of forced cooling, eliminating the problems of fitting to different interfaces of a vehicle, as well as the problem of external diameter of disc brake system being limited by the dimensions of wheel hub, this solution of FIG. 4 presents the inconveniences of "a" and "c" of the solution of FIG. 1 and the following additional inconveniences:

i—Maintenance of any part of system requires removal of the axle from vehicle;

j—Fitting to mounting dimensions in vehicles requires changes and proliferation large and costly components; the assembly in a vehicle having reduced distance between chassis supports may not be feasible, due to the volume of central part;

k—Mechanical capacity of bevel gearing is limited by the central housing casing, which is defined by the interface with the planetary system and the wet disc brake.

SUMMARY OF THE INVENTION

It is a general object of this invention to provide a planetary reduction for drive axles of the type considered herein, which presents the following advantages in relation to the solutions known heretofore:

1—Adequacy to group technology manufacture, i.e., the manufacture of a family of products obtained from a basic design, maintaining the basic dimensions and internal interfaces;

2—Very flexible fitting to different interfaces of vehicle, within a wide range of wheel pilot diameter, or of distance between chassis supports, or of distance between wheel hub flanges;

3—Planetary system and braking system can be designed in an optimized way, since they are not limited by wheel pilot;

4—Possibility of covering a wide range of planetary reduction capacity, by changing the number of the planetary pinions or the width of gears, and possibility of covering a wide range of the brake capacity, by changing the number of discs, are consequences of previous item, as well as of modular construction;

5—The assembly presents high functional integration and few components with low complexity;

6—Besides above advantages, the assembly also keeps some important characteristics found in prior art constructions, such as hydraulic line simplicity and facility in installing forced cooling.

Thus, the object of present invention, with advantages cited above, is reached through provision of a planetary reduction for drive axle of vehicle, comprising:

an axle housing, which is attached to the chassis of the vehicle and which lodges the internal end portion of an axle shaft;

a central sun gear provided on the free external end portion of respective axle shaft, in order to rotate with the latter;

a ring gear, internally toothed and coupled to the housing;

a plurality of planetary pinions, which are kept in mesh with the central sun gear and with the ring gear, each planetary pinion being mounted on a respective shaft;

a planetary spider, in which are overhung mounted the planetary pinion shafts, and which is coupled to a wheel mounting flange. According to the present invention, the planetary reduction further comprises, in a particular way:

an output shaft, with inner end integral with the planetary spider and with opposite end being attached to the wheel mounting flange;

a wheel bearing cage coupled to the axle housing, involving the planetary spider and the inner end of the output shaft;

a bearing set mounted between the wheel bearing cage and an output shaft portion, which is mounted between the planetary spider and the wheel mounting flange; and removable fastening elements, provided through the axle housing, wheel bearing cage and ring gear, in order to hold the latter between the axle housing and the wheel bearing cage.

In a preferred and usual embodiment of the invention, the planetary reduction further includes a wet disc brake assembly, which is mounted around the axle shaft, between the planetary pinions and the axle housing, and which comprises friction discs that are coupled to said axle shaft and alternately arranged with stationary discs, which are coupled to a brake housing attached to the axle housing, preferably between the latter and the ring gear and being passed through by said fastening elements.

As it can be observed, the new construction presented herein allows that the planetary pinions, the planetary spider and the wheel mounting flange be supported on the axle housing, through wheel bearings located externally to the planetary pinions, eliminating dimensional and shape interferences between the wheel rim of vehicle and the diameter of the planetary reduction, thus substantially simplifying the construction of the whole assembly.

Furthermore, the mounting of the ring gear, and eventually of the brake housing, between the axle housing and the wheel bearing cage allows a great versatility in the design, since constructive or dimensional changes can be made in the gear and/or brake systems, without requiring changes in the basic design of both axle housing and wheel bearing cage parts.

BRIEF DESCRIPTION OF THE DRAWINGS

The invention will be described now, with reference to attached drawings, in which.

DETAILED DESCRIPTION OF THE INVENTION

Figure 1:
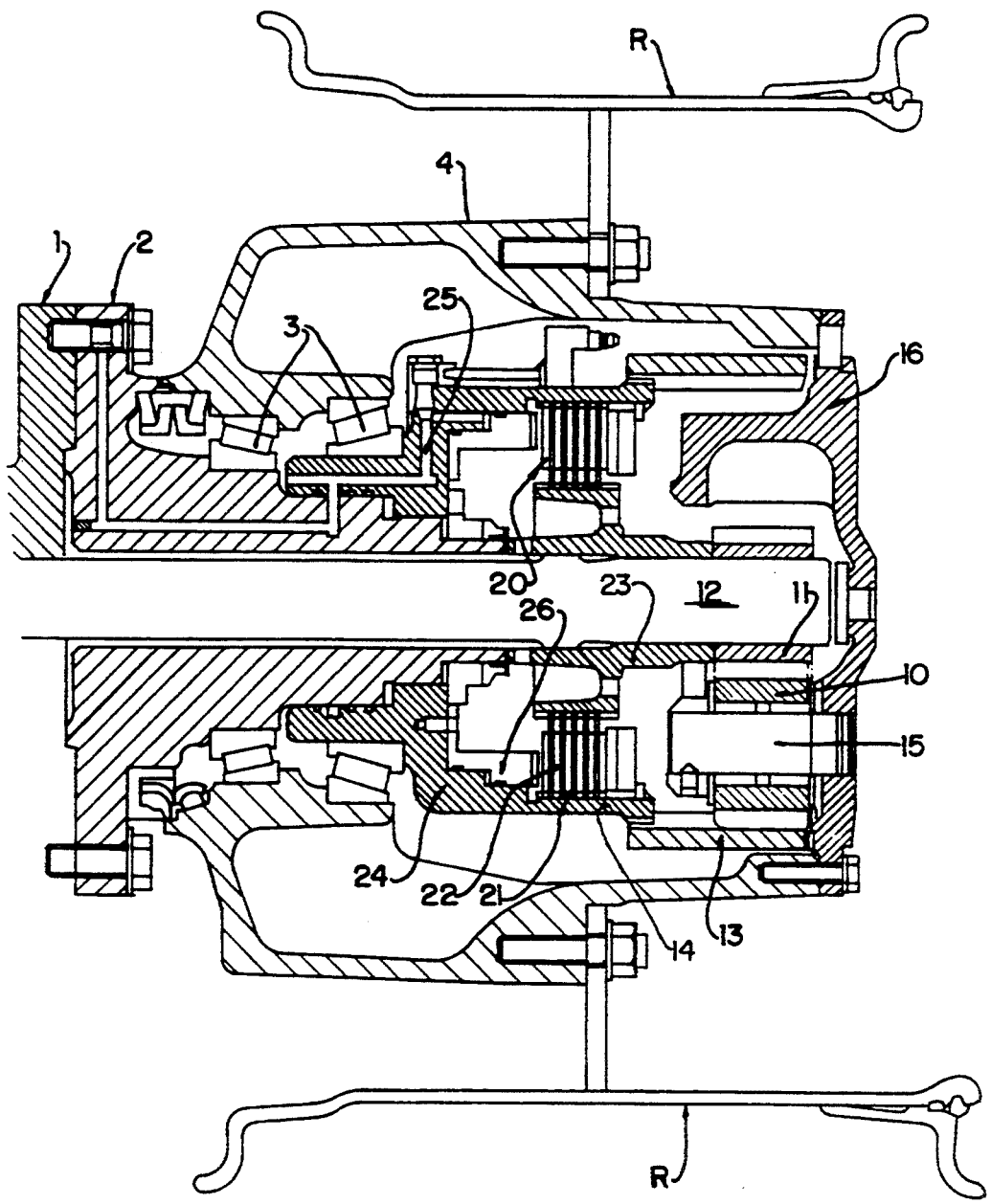
FIG. 1 illustrates a longitudinal diametral section view of a drive axle end of vehicle, comprising a planetary reduction and a wet disc brake assembly constructed according to a first solution of prior art.
Figure 2:
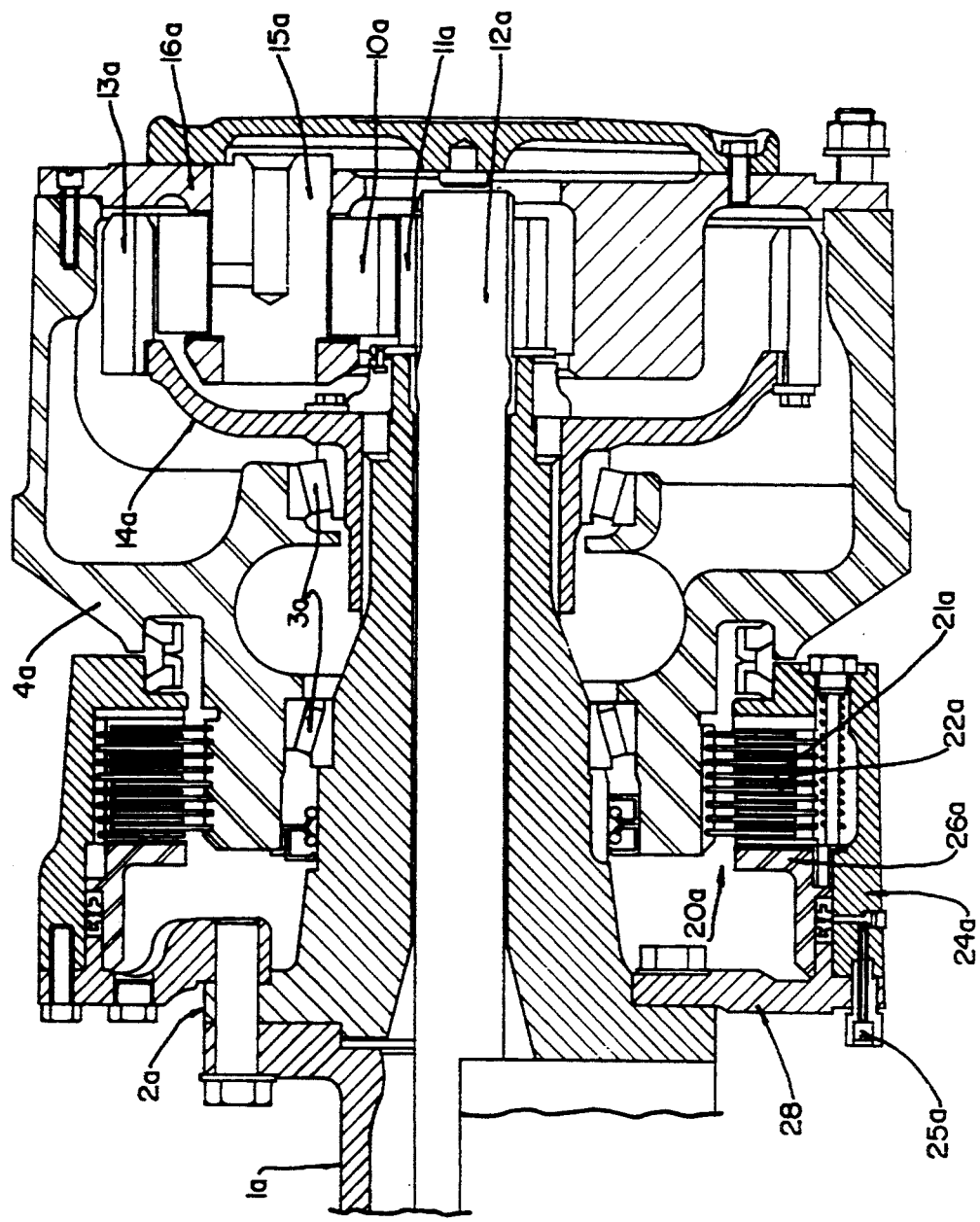
FIG. 2 represents a view that is similar to that of FIG. 1, but referring to a second constructive solution of prior art, in which the disc brake assembly has been removed from the region comprised by the wheel mounting flange.
Figure 3:
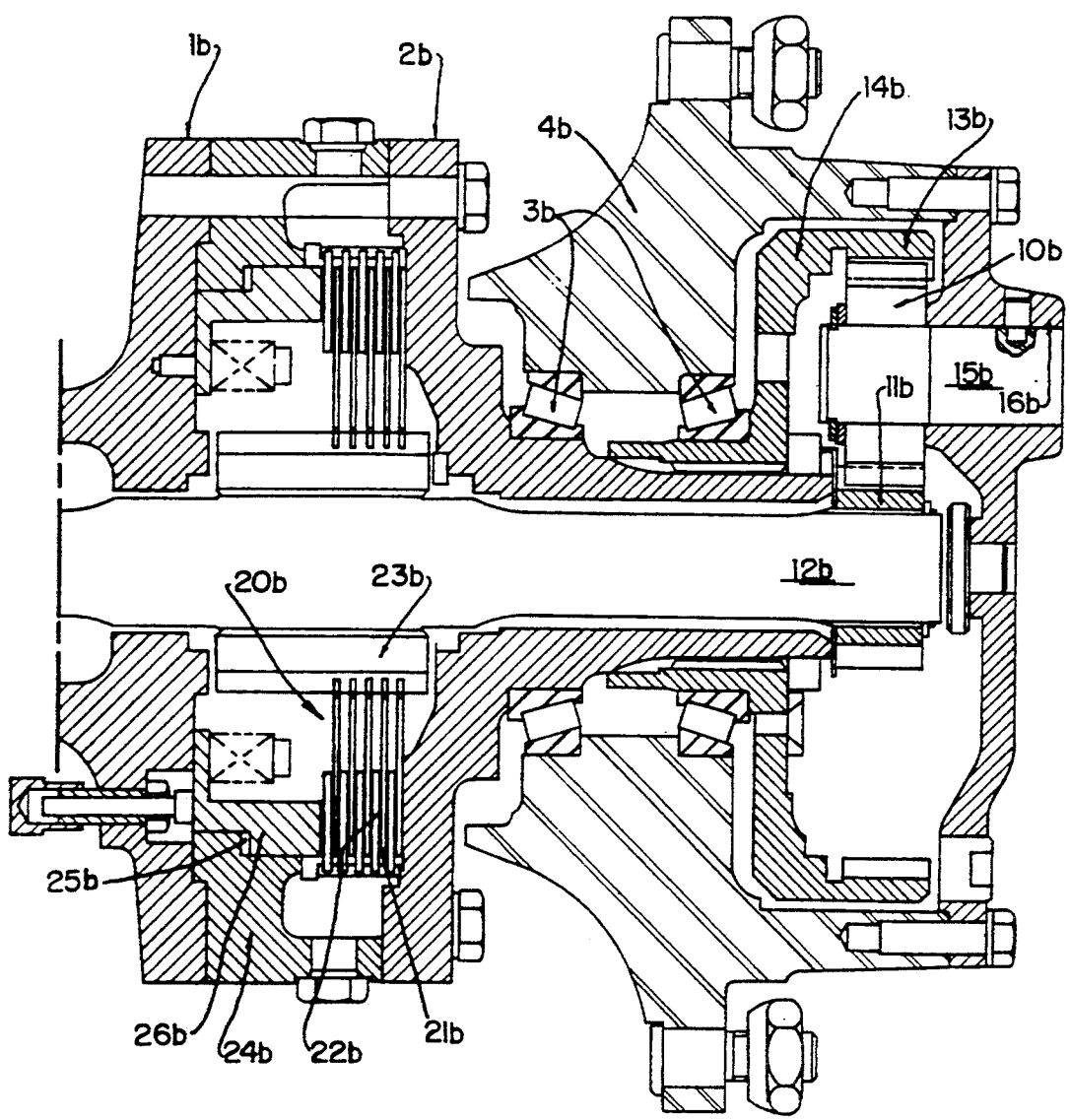
FIGS. 3 and 4 represent, respectively, a third and a fourth constructive solution of prior art.
Figure 4:
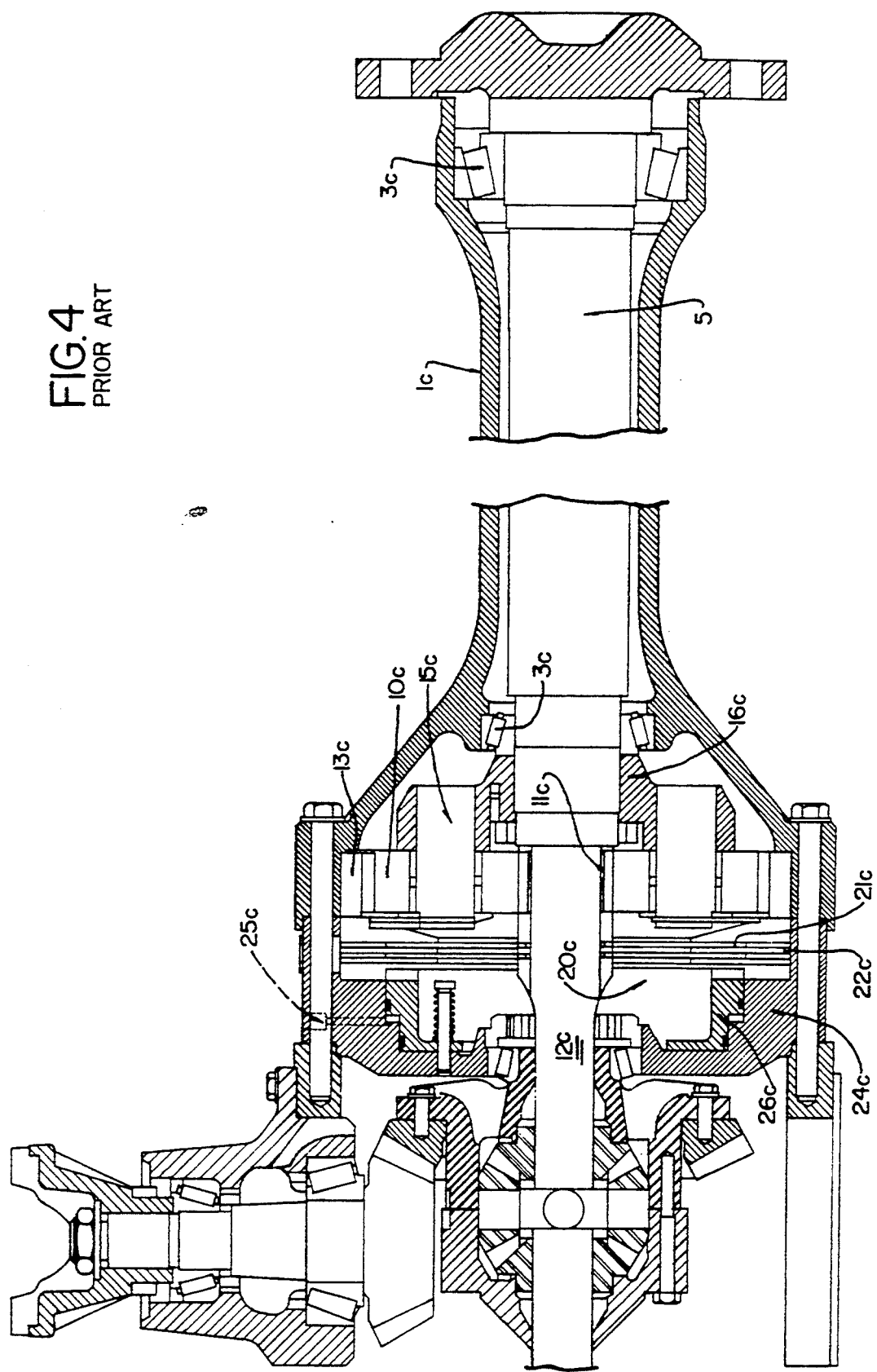
Figure 5:
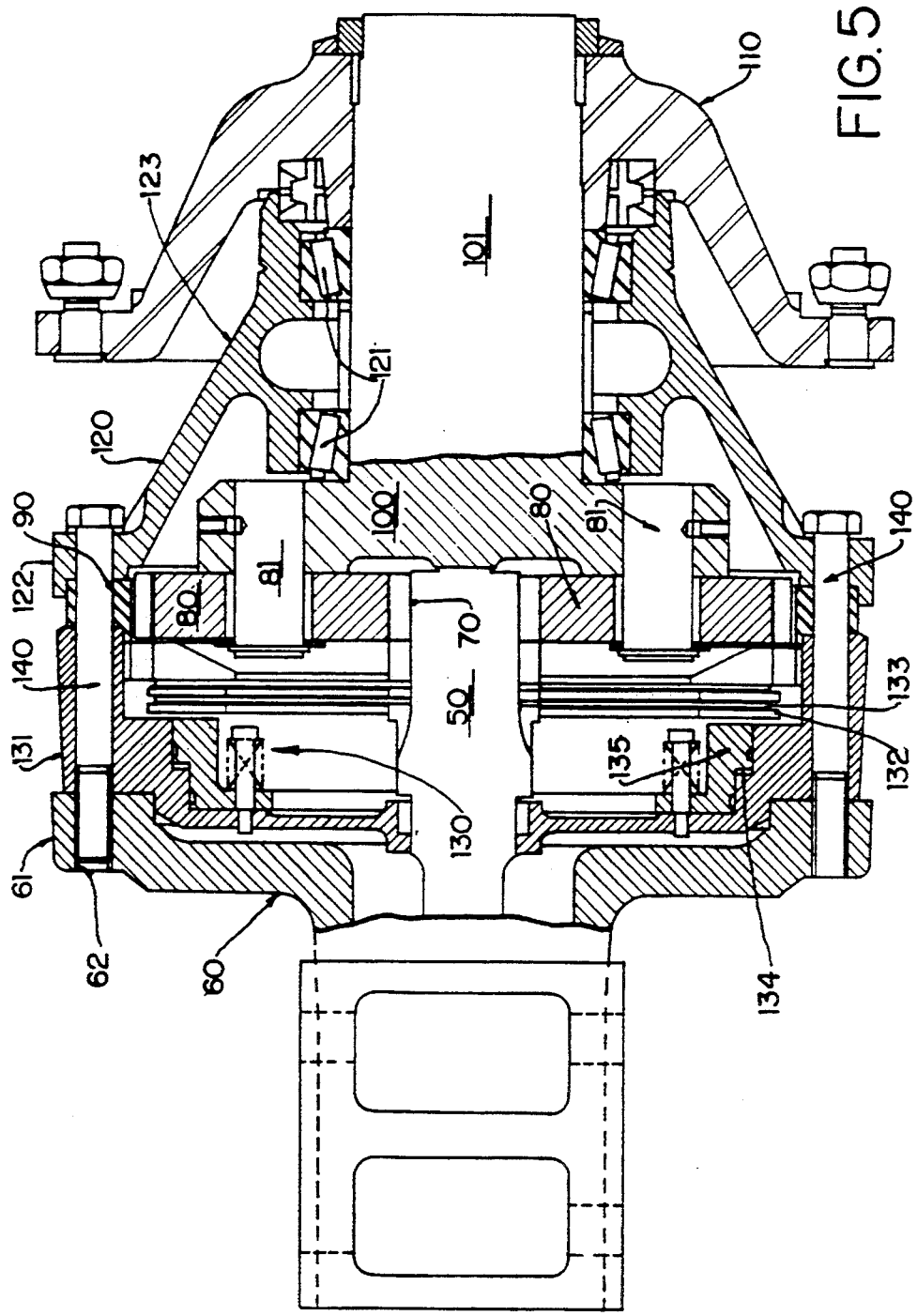
FIG. 5 illustrates a longitudinal diametral section view of a drive axle end of vehicle, comprising a planetary reduction, which has been constructed according to the present invention and includes a wet disc brake.

As illustrated in FIG. 5, the planetary reduction of this invention is mounted on the external end of axle shaft 50, which is projected from axle housing 60 attached to the chassis of vehicle (not illustrated), or to other similar equipment, more particularly for off-highway application.

As it is known, the end portion of said axle housing 60 defines ring flange 61 provided with axial orifices 62, which function will be described later. The external end of axle shaft 50 holds central sun gear 70, around which planetary pinions 80 are meshed, said planetary pinions are mounted on respective shafts 81 and kept in constant meshing with ring gear 90, which is provided in the same plane of planetary pinions 80 and central sun gear 70. The ring gear 90 is coupled to the axle housing 60.

The planetary pinion shafts 81 are overhung mounted in planetary spider 100 which, in the illustrated embodiment, is in the form of a flange with its external face incorporating the internal end of output shaft 101 presenting wheel mounting flange 110 attached to its external end.

The planetary reduction object of present invention further comprises tubular wheel bearing cage 120, which has internal end edge 122 coupled to axle housing 60 and opposite external portion 123 supporting portion of output shaft 101, which is arranged between planetary spider and wheel mounting flange, through wheel bearing set 121.

Axially and successively coupled to axle housing flange 61, there are provided a brake housing 131, ring gear 90 and wheel bearing cage 120, the fastening thereof being made through a plurality of fasteners, such as bolts 140 screwed into orifices 62 of flange 61 of the axle housing 60, and which pass through respective orifices provided in wheel bearing cage 120, in ring gear 90 and in brake housing 131 (if there is one).

The disc brake assembly 130 comprises, besides brake housing 131, at least one stationary disc 132, which is constrained in rotation and axially free in relation to brake housing 131, and at least one friction disc 133, which is constrained in rotation and axially free in relation to the axle shaft 50. During the braking operation, pressurized fluid reaches the cylinder, which is internal to brake assembly 130, through hydraulic line 134, producing, through piston 135, a uniform compressive axial force between stationary discs 132 and friction discs 133, thus causing the braking of axle shaft 50 by friction between said discs, the braking torque being transmitted to wheel mounting flange 110, through the planetary reduction in an amplified way.

We claim:
1. A planetary reduction for drive axles of a vehicle having a chassis, said planetary reduction comprising:
   an axle shaft (50) having an internal end portion and a free external end portion;
   an axle housing (60) attached to said chassis of said vehicle, within which is lodged said internal end portion of said axle shaft (50);
   a central sun gear (70) at said free external end portion of said axle shaft (50), said sun gear adapted to rotate with said free external end portion of said axle shaft;
   a ring gear (90) having internal teeth, said ring gear coupled to said axle housing (60);
   a plurality of pinions (80), each of said pinions mounted on a respective shaft (81), said pinions meshing with said sun gear (70) and said ring gear (90);
   a planetary spider (100) coupled to a wheel mounting flange (110), said pinion shafts (81) being fixed to said planetary spider;
   an output shaft (101) having an internal end and an external end, said internal end coupled to said planetary spider (100) and said output end coupled to said wheel mounting flange (110);
   a wheel bearing cage (120) coupled to said axle housing (60) which encloses said planetary spider (100) and said internal end of said output shaft (101);
   a wheel bearing set (121) mounted between said wheel bearing cage (120) and said output shaft (101), said wheel bearing set residing between said planetary spider (100) and said wheel mounting flange (110);
   a wet brake assembly (130) having at least one stationary disc (132) and at least one friction disc (133), said at least one friction disc constrained in rotation relative to said axle shaft (50),
   a brake housing (131) coupled to said axle housing (60), said at least one stationary disc attached to said brake housing and being constrained in rotation relative to said axle housing (60); and
   removable fastening elements (140) for holding said ring gear (90) and said brake housing (131) adjacent to each other and between said axle housing (60) and said wheel bearing cage (120), said removable fastening elements being provided through said axle housing, said ring gear and said wheel bearing cage.

2. A planetary reduction for drive axles of a vehicle having a chassis, said planetary reduction comprising:
   an axle shaft (50) having an internal end portion and a free external end portion;
   an axle housing (60) attached to said chassis of said vehicle, within which is lodged said internal end portion of said axle shaft (50);
   a central sun gear (70) at said free external end portion of said axle shaft (50), said sun gear adapted to rotate with said free external end portion of said axle shaft;
   a ring gear (90) having internal teeth, said ring gear coupled to said axle housing (60);

a plurality of pinions (80), each of said pinions mounted on a respective shaft (81), said pinions meshing with said sun gear (70) and said ring gear (90);

a planetary spider (100) coupled to a wheel mounting flange (110), said pinion shafts (81) being fixed to said planetary spider;

an output shaft (101) having an internal end and an external end, said internal end coupled to said planetary spider (100) and said output end coupled to said wheel mounting flange (110);

p wheel bearing cage (120) coupled to said axle housing (60) which encloses said planetary spider (100) and said output shaft (101) internal end;

a wheel bearing set (121) mounted between said wheel bearing cage (120) and said output shaft (101), said wheel bearing set residing between said planetary spider (100) and said wheel mounting flange (110);

a wet brake assembly (130) having at least one stationary disc (132) and at least one friction disc (133), said at least one friction disc constrained in rotation relative to said axle shaft (50);

a brake housing (131) coupled to said axle housing (60), said at least one stationary disc attached to said brake housing and being constrained in rotation relative to said axle housing (60), said brake housing (131) and said ring gear (90) defining external annual portions of a housing between said axle housing (60) and said wheel bearing cage; and removable fastening elements (140) for holding said ring gear (90) between said axle housing (60) and said wheel bearing cage (120), said removable fastening elements being provided through said axle housing, said ring gear and said wheel bearing cage.

* * * * *